United States Patent
Tang et al.

(10) Patent No.: US 9,203,301 B2
(45) Date of Patent: Dec. 1, 2015

(54) FEEDBACK FOR CONTROLLING THE SWITCHING FREQUENCY OF A VOLTAGE REGULATOR

(75) Inventors: Joel Tang, Sembawang (SG); Charles Yeoh, Symphony Heights (SG); Seth Kahn, San Francisco, CA (US); David Lidsky, Oakland, CA (US); Michael McJimsey, Danville, CA (US)

(73) Assignee: Volterra Semiconductor Corporation, Fremont, CA (US)

( * ) Notice: Subject to any disclaimer, the term of this patent is extended or adjusted under 35 U.S.C. 154(b) by 313 days.

(21) Appl. No.: 13/166,681

(22) Filed: Jun. 22, 2011

(65) Prior Publication Data

US 2011/0316502 A1    Dec. 29, 2011

Related U.S. Application Data

(60) Provisional application No. 61/357,681, filed on Jun. 23, 2010.

(51) Int. Cl.
*G05F 1/00* (2006.01)
*H02M 3/156* (2006.01)

(52) U.S. Cl.
CPC .................................. *H02M 3/156* (2013.01)

(58) Field of Classification Search
USPC .................. 323/271, 282, 283, 284, 285, 286
See application file for complete search history.

(56) References Cited

U.S. PATENT DOCUMENTS

| | | |
|---|---|---|
| 5,847,554 A | 12/1998 | Wilcox et al. |
| 6,020,729 A | 2/2000 | Stratakos et al. |
| 6,160,441 A | 12/2000 | Stratakos et al. |
| 6,225,795 B1 | 5/2001 | Stratakos et al. |
| 6,278,264 B1 | 8/2001 | Burstein et al. |
| 6,445,244 B1 | 9/2002 | Stratakos et al. |
| 6,462,522 B2 | 10/2002 | Burstein et al. |
| 6,476,589 B2 | 11/2002 | Umminger et al. |
| 6,664,774 B2 | 12/2003 | Lethellier |
| 6,713,823 B1 | 3/2004 | Nickel |
| 7,170,267 B1 | 1/2007 | McJimsey |
| 7,245,113 B2 | 7/2007 | Chen et al. |
| 8,018,208 B1 | 9/2011 | Kahn et al. |
| 8,120,342 B1 | 2/2012 | Kahn et al. |
| 8,283,902 B1 | 10/2012 | Kahn et al. |
| 8,629,669 B2 | 1/2014 | Tournatory et al. |

(Continued)

OTHER PUBLICATIONS

Analog Devices, (2007) "Low Duty Cycle, 600 mA, 3 MHz Synchronous Step-Down DC-to-DC Converter," ADP2102 (Product Design Brochure), *Analog Devices, Inc.*, 24 pp.

(Continued)

*Primary Examiner* — Nguyen Tran
(74) *Attorney, Agent, or Firm* — Weaver Austin Villeneuve & Sampson LLP

(57) ABSTRACT

Disclosed are devices, apparatus, circuitry, components, mechanisms, modules, units, systems, and processes for controlling the switching frequency of a voltage regulator. Frequency monitoring and adjustment circuitry is coupled to sense a switching frequency of a power switch coupled to an output filter of the voltage regulator. The frequency monitoring and adjustment circuitry is configured to provide a frequency adjustment signal based on the sensed switching frequency. Power switch control circuitry is coupled to receive the frequency adjustment signal and is configured to control switching of the power switch based on the frequency adjustment signal.

36 Claims, 9 Drawing Sheets

(56) References Cited

U.S. PATENT DOCUMENTS

| | | | |
|---|---|---|---|
| 8,779,744 B2 | 7/2014 | Kahn | |
| 2004/0051510 A1* | 3/2004 | Saggini et al. | 323/282 |
| 2004/0070382 A1* | 4/2004 | Walters et al. | 323/284 |
| 2005/0200343 A1* | 9/2005 | Ueda | 323/282 |
| 2006/0220627 A1* | 10/2006 | Koh | 323/282 |
| 2007/0285074 A1* | 12/2007 | Maekawa et al. | 323/293 |
| 2008/0088289 A1* | 4/2008 | Fogg et al. | 323/283 |
| 2008/0129264 A1* | 6/2008 | Moussaoui et al. | 323/283 |
| 2009/0009148 A1* | 1/2009 | Philbrick | 323/282 |
| 2009/0322298 A1* | 12/2009 | Nishida | 323/282 |
| 2010/0213910 A1* | 8/2010 | Chen | 323/282 |
| 2012/0025796 A1 | 2/2012 | Tournatory et al. | |
| 2012/0025799 A1 | 2/2012 | Kahn | |

OTHER PUBLICATIONS

Analog Devices, (2009-2010) "Synchronous Current-Mode with Constant On-Time, PWM Buck Controller," ADP1872/ADP1873 (Product Design Brochure), *Analog Devices, Inc.*, 40 pp.

Chetty, P.R.K. (Copyright 1986) "Switch-Mode Power Supply Design," *TAB Professional and Reference Books*, 5 pp.

Linear Technology, (2008) "2.5A, 10V, Monolithic Synchronous Step-Down Regulator," LTC3602 (Product Design Brochure), *Linear Technology Corporation*, 20 pp.

Maxim, (Oct. 2003) "3A, 1MHz, 1% Accurate, Internal Switch Step-Down Regulator with Power-OK," MAX8505 (Product Design Brochure), *Maxim Integrated Products*, 15 pp.

* cited by examiner

US 9,203,301 B2

FEEDBACK FOR CONTROLLING THE SWITCHING FREQUENCY OF A VOLTAGE REGULATOR

PRIORITY CLAIM

This disclosure claims priority to U.S. Provisional Patent Application No. 61/357,681, filed Jun. 23, 2010, titled FREQUENCY LOCK LOOP MECHANISM FOR CONTROLLING THE SWITCHING FREQUENCY OF A VOLTAGE REGULATOR, by Tang, et al. and assigned to the assignee hereof. The disclosure of this prior application is hereby incorporated by reference in its entirety and for all purposes.

BACKGROUND

This disclosure relates generally to voltage regulators and, more particularly, to the architecture and control mechanisms of switching voltage regulators.

Voltage regulators, such as direct current (DC) to DC converters, are used to provide stable voltage sources for electronic devices and systems. The general purpose of a voltage regulator is to convert a source voltage, such as the voltage of an alternating current (AC) or DC power source, into the operating DC voltage of an electronic device. By way of example, efficient DC to DC converters can be used in applications including battery management in low power devices, such as laptop notebooks and cellular phones.

Switching voltage regulators, often referred to as "switching regulators," are a type of DC to DC converter that convert one DC voltage to another DC voltage with high efficiency. A switching regulator generates an output voltage by converting an input DC voltage into a high frequency voltage, and filtering the high frequency voltage to produce the output DC voltage.

Conventional switching regulators typically include a switch for alternately coupling and decoupling an unregulated input DC voltage source, such as a battery, to a load, such as an integrated circuit. An output filter, typically including an inductor and a capacitor, is coupled between the switch and the load to filter the output of the switch and thus provide the output DC voltage. Power is transmitted through the switch and into the output filter in the form of discrete current pulses. The switching regulator operates on the principle of storing energy in the inductor during one portion of a cycle and then transferring the stored energy to the capacitor in the next portion of the cycle. The output filter converts the current pulses into a steady load current so that the voltage across the load is regulated.

SUMMARY

The devices, apparatus, circuitry, components, mechanisms, modules, units, systems, and processes of this disclosure each have several innovative aspects, no single one of which is solely responsible for the desirable attributes disclosed herein.

According to one aspect of this disclosure, circuitry is provided for controlling the switching frequency of a voltage regulator. Frequency monitoring and adjustment circuitry is coupled to sense a switching frequency of a power switch coupled to an output filter of the voltage regulator. The frequency monitoring and adjustment circuitry is configured to provide a frequency adjustment signal based on the sensed switching frequency. Power switch control circuitry is coupled to receive the frequency adjustment signal. The power switch control circuitry is configured to control switching of the power switch based on the frequency adjustment signal. In some implementations, the frequency monitoring and adjustment circuitry is configured to compare the switching frequency of the power switch with a reference frequency, and generate the frequency adjustment signal according to the comparison.

In some implementations, a varying current can be provided to the output filter responsive to the power switch switching between an input first voltage and an input second voltage, where the switching frequency is associated with the varying current. The frequency adjustment signal can indicate or be combined with another signal to indicate a ripple band of the varying current. The ripple band of the varying current is generally defined by an upper threshold level and a lower threshold level between which the varying current varies. The ripple band can be adjusted by the power switch control circuitry, including adjusting one or more of the upper threshold level and the lower threshold level.

In some implementations, the power switch control circuitry includes a latch having an output coupled to an input of the power switch, and a timer having an output coupled to an input of the latch and an input coupled to receive the frequency adjustment signal from the frequency monitoring and adjustment circuitry. In such implementations, the frequency adjustment signal can indicate a pulse width of the timer.

In some other implementations, the frequency monitoring and adjustment circuitry includes a comparator configured to compare a switching pulse signal corresponding to the sensed switching frequency with a reference pulse signal corresponding to the reference frequency to provide a compared signal. The frequency monitoring and adjustment circuitry can include a control mechanism coupled to receive the compared signal from the comparator and configured to output the frequency adjustment signal responsive to the compared signal. In some implementations, the control mechanism includes a current digital-to-analog converter configured to output the frequency adjustment signal in the form of a current signal.

According to another aspect of this disclosure, a voltage regulator includes an output filter to be coupled to a load. A power switch is coupled to the output filter and is capable of providing a varying current to the output filter. The varying current is associated with a switching frequency of the power switch switching between an input first voltage and an input second voltage. Frequency monitoring and adjustment circuitry is coupled to sense the switching frequency of the power switch and configured to provide a frequency adjustment signal based on the sensed switching frequency. Power switch control circuitry is coupled to receive the frequency adjustment signal and configured to adjust a ripple band of the varying current responsive to the frequency adjustment signal.

According to another aspect of this disclosure, a voltage regulator control process includes sensing a switching frequency of a power switch coupled to an output filter of the voltage regulator. A varying current is capable of being provided to the output filter responsive to the power switch switching between an input first voltage and an input second voltage. The switching frequency is associated with the varying current. A frequency adjustment signal based on the sensed switching frequency is provided. A ripple band of the varying current is adjusted responsive to the frequency adjustment signal.

Details of embodiments and implementations are set forth in the accompanying drawings and the description below. Various features and aspects of the disclosed subject matter may be realized by reference to the remaining portions of the specification and the drawings. Note that the relative dimensions of the following figures may not be drawn to scale.

BRIEF DESCRIPTION OF THE DRAWINGS

The included drawings are for illustrative purposes and serve only to provide examples of possible structures and process steps for the disclosed inventive devices, apparatus, circuitry, components, mechanisms, modules, units, systems, and processes.

Like reference numbers and designations in the various drawings indicate like elements.

DETAILED DESCRIPTION OF SPECIFIC EMBODIMENTS

Figure 1A:
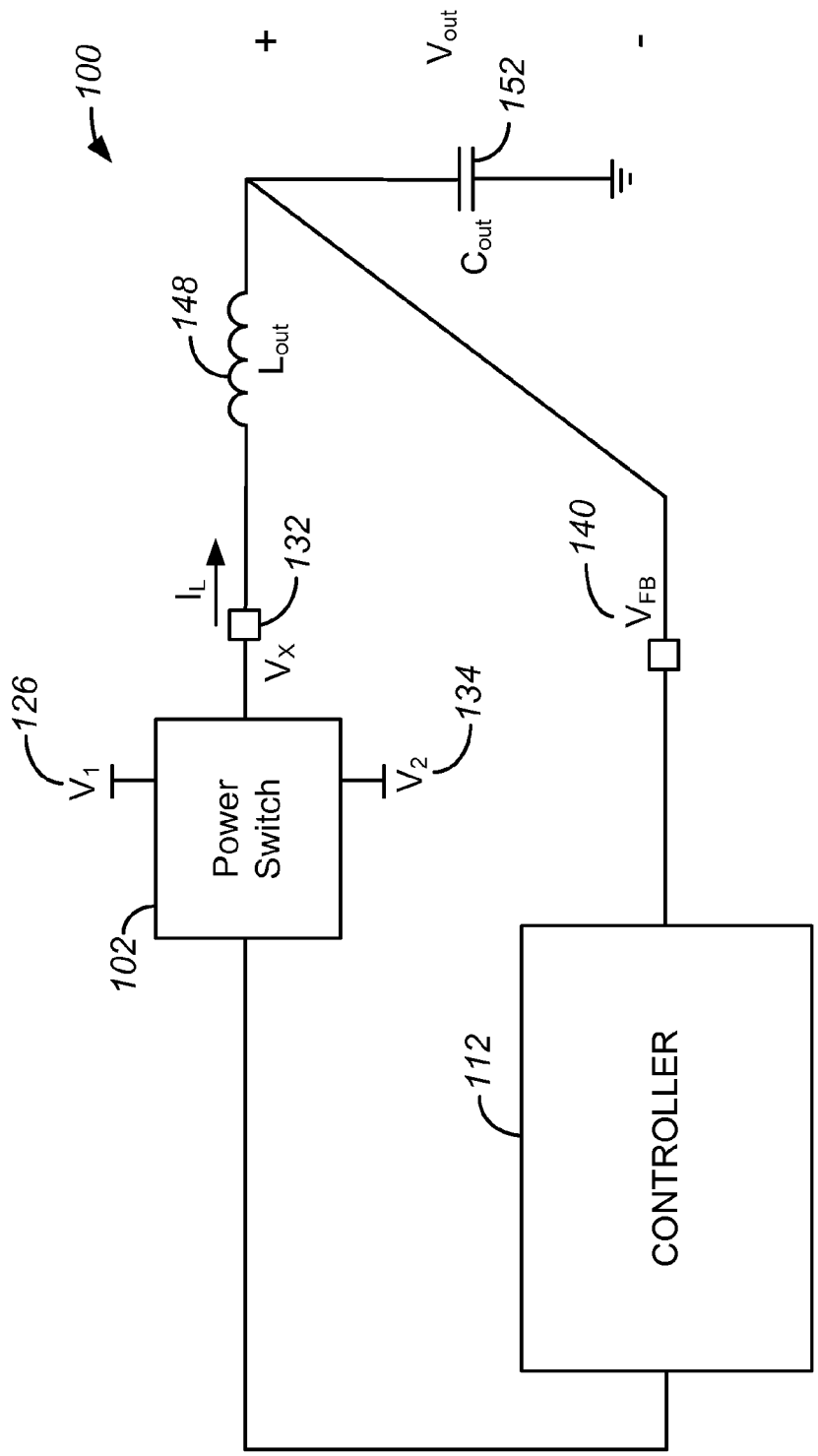
FIG. 1A is a simplified diagram of components of a voltage regulator 100, according to an embodiment of the invention.

Reference will now be made in detail to specific embodiments including the best modes contemplated by the inventors. Examples of these specific embodiments are illustrated in the accompanying drawings. While the disclosed subject matter is described in conjunction with these specific embodiments, it will be understood that it is not intended to be limited to the described embodiments. On the contrary, it is intended to cover alternatives, modifications, and equivalents as may be included within the spirit and scope of the invention as defined by the appended claims. In the following description, specific details are set forth in order to provide a thorough understanding of the disclosed subject matter. The disclosed subject matter may be practiced without some or all of these specific details. In addition, well-known features may not have been described in detail to avoid unnecessarily obscuring the disclosed subject matter.

Embodiments of the disclosed devices, apparatus, circuitry, components, mechanisms, modules, units, systems, and processes provide techniques for controlling and adjusting the switching frequency of a voltage regulator. In some embodiments, the switching frequency is monitored, for instance, using a feedback loop. The monitored switching frequency can be used to control the switching frequency, for instance, by adjusting the on time of a fixed on time voltage regulator or adjusting the ripple band of current delivered to an inductor in the output filter of the regulator. By way of example, the monitored switching frequency can be compared with a reference frequency generated on-chip or off-chip to adjust one or both of upper and lower threshold levels defining the allowable ripple band. In some embodiments, an adjustment signal based on the monitored switching frequency is directly provided as a control frequency signal to control the switching frequency. That is, the ripple band itself can be directly set and adjusted by a signal representing a comparison of the switching frequency with the reference frequency. In some other embodiments, the adjustment signal is applied to, e.g., summed with, an input frequency signal, for instance, indicating a desired switching frequency, to define the control frequency signal.

In some embodiments, the disclosed techniques are implemented in fixed on time or fixed off time voltage regulators. For example, the on time of a switching component of a power switch can be set and adjusted based on a control signal generated by comparing the monitored switching frequency with a reference frequency.

In some embodiments, the disclosed techniques for monitoring and adjusting the switching frequency are implemented in the context of current mode control of a switching voltage regulator. The disclosed techniques can also be implemented with voltage mode controllers.

Embodiments of the disclosed frequency monitoring and adjustment mechanisms can be implemented with analog circuitry, digital circuitry, and combinations thereof. Analog implementations include linear response adjustments and slew rate limited response adjustments based on the monitored switching frequency, as further described below. Digital implementations include cycle-by-cycle adjustments and time averaged responses based on the monitored switching frequency, examples of which are described below.

Various devices, apparatus, circuitry, components, mechanisms, modules, units, systems, and processes can be incorporated to monitor the switching frequency of a voltage regulator and generate correction terms, which can be conveyed as signals to govern the switching frequency of the regulator.

The switching frequency of a voltage regulator can be influenced by factors including variations in the input voltage supply, the output voltage, and inductance of the inductor in the output filter. Physical characteristics such as inductance mismatch and other irregularities can be the cause of such variations, as can the accuracy of current measurements at the inductor. The switching frequency can also vary according to different loads coupled to the output filter that affect the output voltage. These factors can undesirably change the switching frequency from what was intended. In some implementations, controlling and adjusting the switching frequency using the disclosed techniques can provide enhanced robustness and control to address such factors.

The disclosed embodiments generally relate to and can be incorporated in switching voltage regulators and specific components thereof to facilitate voltage conversion. These embodiments are generally described in relation to DC to DC converters that employ buck topologies (also referred to as buck regulators), which convert an input DC voltage to a lower output DC voltage of the same polarity. It should be understood that embodiments are contemplated in which other topologies are employed in various combinations.

FIG. 1A is a simplified diagram of components of a voltage regulator 100, according to an embodiment of the invention. The voltage regulator 100 includes three main components: a power switch 102, a controller 112, and an output filter including an output inductor 148 and an output capacitor 152. The power switch 102 is coupled to the output filter at a switching node 132 ("Vx"). In particular, the power switch 102 has an output coupled to an input of inductor 148 at node Vx. An output of inductor 148 is coupled to a first terminal of output capacitor 152, while a second terminal of output capacitor 152 is coupled to ground. The output capacitor 152 can be coupled to a load (not shown) such as an integrated circuit.

In FIG. 1A, the power switch 102 controls the flow of current into inductor 148 of the output filter at Vx. This inductor current is referred to herein as "$I_L$." The power switch 102 is generally configured to alternately couple the output filter at Vx to a first voltage 126 ("$V_1$") and a second voltage 134 ("$V_2$"). In one example, $V_1$ can be a supply voltage, that is, an input voltage source to be regulated, and $V_2$ can be another voltage, such as ground. In some implementations, driver and control circuitry can be coupled to an input of power switch 102, that is, between controller 112 and power switch 102, as further described below with reference to FIG. 1B. Such driver and control unit(s) generally include circuitry and logic configured to drive the switching of power switch 102 between $V_1$ and $V_2$. The driver and control unit(s) can also include protection circuitry, and other various analog and/or digital circuitry to monitor voltages and interact with components of the power switch 102. As used herein, such driver and control circuitry is generally considered separate circuitry from power switch 102, and is omitted from FIG. 1A for purposes of illustration. Depending on the desired implementation, the driver and control unit(s) can be located on a different chip from power switch 102, located on the same chip as power switch 102, and/or located on the same or different chip as controller 112.

In FIG. 1A, the controller 112 is operatively coupled to control the alternate switching of power switch 102 between $V_1$ and $V_2$ responsive to a feedback signal from the output filter. In the illustrated example, the controller 112 has an input coupled to sense a feedback voltage 140 ("$V_{FB}$") at the output filter, that is, at a node between inductor 148 and capacitor 152, and an output coupled to the input of power switch 102 to control the switching of power switch 102 responsive to the sensed voltage $V_{FB}$. In alternative implementations, the input of controller 112 can be coupled to other nodes of voltage regulator 100, such as Vx.

Figure 1B:
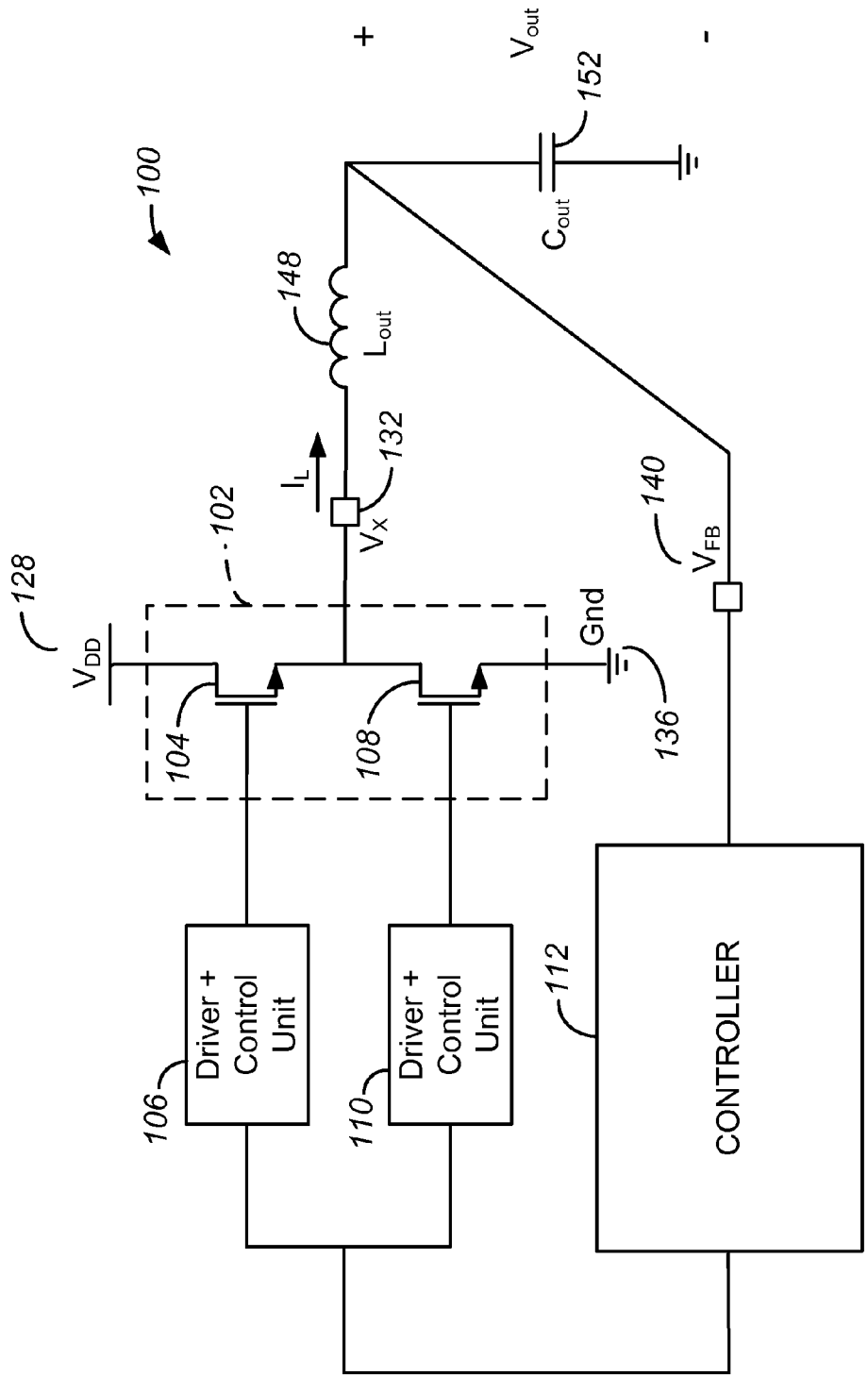
FIG. 1B is a simplified diagram of components of voltage regulator 100, showing one example of a power switch and an example of driver and control circuitry, according to an embodiment of the invention.

FIG. 1B is a simplified diagram of components of voltage regulator 100, showing one example of a power switch and an example of driver and control circuitry, according to an embodiment of the invention. In this example, power switch 102 incorporates a "high side" switch component 104, such as a transistor, and a "low side" switch component 108, such as a transistor or a diode. Here, the high side switch component 104 is coupled to a supply voltage 128 ("$V_{DD}$"), while the low side switch component 108 is coupled to ground ("Gnd") 136. As used herein, a high side or low side switch component can be referred to as a high side or low side "switch."

In FIG. 1B, the high side switch 104, in the form of a transistor, is configured to selectively couple the output filter at node Vx to $V_{DD}$, while the low side switch 108, in the form of a separate transistor, is configured to selectively couple the output filter at node Vx to Gnd. In this illustrative example, an upper driver and control unit 106 is coupled to a gate of the transistor serving as high side switch 104, and a lower driver and control unit 110 is coupled to a gate of the transistor serving as low side switch 108. The driver and control units 106 and 110 are configured to drive the alternate on/off switching of high side switch 104 and low side switch 108 so Vx is alternately coupled between $V_{DD}$ and ground. The driver and control units 106 and 110 have inputs coupled to the output of controller 112 so that controller 112 causes driver and control units 106 and 110 to alternate between: (i) switching high side switch 104 on while low side switch 108 is switched off, and (ii) switching low side switch 108 on while high side switch 104 is switched off. The relative time spent with the high side switch enabled compared to the low side switch enabled determines an output voltage ("Vout") developed across capacitor 152 of the output filter. In FIG. 1B, the driver and control units 106 and 110 are configured to cooperate with one another in controlling the high side switch 104 and low side switch 108 states, for example, to ensure both are not turned on at the same time.

A transistor incorporated into a high side or low side switch of power switch 102 as described above can be implemented as a FET, such as a metal oxide semiconductor field effect transistor ("MOSFET"), as illustrated in FIG. 1B. The high side FET(s) of high side switch 104 can be p-channel or n-channel, depending on the desired implementation. In an alternative embodiment, a different type of transistor is used, such as a junction gate field effect transistor ("JFET"). In the example of FIG. 1B, while high side switch 104 is illustrated as one FET, the high side switch 104 can be implemented to include one or more transistors, such as n-channel FETs, and the low side switch 108 can also be implemented to include one or more transistors, such as n-channel FETs. For example, the high side switch 104 could include a number of transistors coupled in parallel and acting in unison. The switching node Vx at the output of power switch 102 is situated between the high side FET and the low side FET, in this implementation, between the source of the high side FET and the drain of the low side FET.

Figure 2:
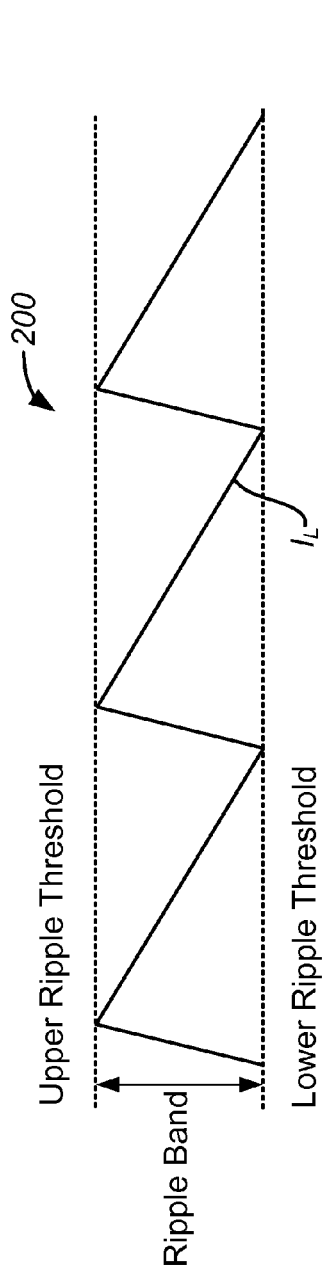
FIG. 2 is an illustration of a ripple waveform 200 of current $I_L$ provided to an inductor of the output filter of voltage regulator 100, according to an embodiment of the invention.

FIG. 2 is an illustration of a ripple waveform 200 of current $I_L$ delivered to inductor 148 of the output filter at node Vx 132 of FIGS. 1A and 1B, in association with the alternate switching of the power switch as described above, according to an embodiment of the invention. As shown in FIG. 2, $I_L$ ramps up and down in sequence with the switching between high side switch 104 and low side switch 108 of power switch 102. For example, in the configuration of FIG. 1B, when high side switch 104 is turned on, $I_L$ ramps up, and when low side switch 108 is turned on, $I_L$ ramps down.

In FIG. 2, the transition points where $I_L$ changes from ramping up to ramping down, and vice versa, can be governed by various control processes in accordance with the disclosed implementations. In one control process, thresholds are set at the respective high side and low side switches of the power switch. For example, high side switch 104 can have an associated upper threshold level, and low side switch 108 can have an associated lower threshold level. A power switch controller, described in greater detail below, can control the switching of the high side and low side switches so the low side switch turns on when an increasing $I_L$ reaches the upper threshold level, and the high side switch turns on when a decreasing $I_L$ reaches the lower threshold level. The resulting time-varying waveform 200 of FIG. 2 illustrates that $I_L$ "ripples" up and down between the upper and lower thresholds. The upper and lower threshold levels define a "ripple band" of the $I_L$ waveform, which varies between such thresholds.

Another control process can be used to implement the disclosed techniques in the context of a fixed current ripple regulator. For example, a low to high transition of the power switch, that is, the low side switch turning off and the high side switch turning on, can be triggered by the power switch controller in response to a designated event, such as the output voltage, Vout, dropping below a threshold. The high to low transition, that is, the high side switch turning off and the low side switch turning on, can be triggered by a fixed current ripple above the turn on point. Thus, current ripple can still be used to control the transitions, and the current ripple can be adjusted to achieve the desired switching frequency.

In a voltage regulator, which employs ripple band regulation as described herein, setting and adjusting the ripple band, including one or more of the upper and lower ripple threshold levels, can control the switching frequency of the power switch 102. In one example, this switching frequency, Fsw, can be derived as:

$$Fsw = \frac{Vin - Vout}{I_L \cdot Lout} \cdot \frac{Vout}{Vin}$$

where:
Vin is the input supply voltage such as $V_{DD}$ of FIG. 1B,
Vout is the output regulated voltage,
$I_L$ is the inductor 148 current ripple band, and
Lout is the inductance value of inductor 148.

Those skilled in the art should appreciate that the equation above is an approximation for first order work.

It can be seen that the switching frequency, Fsw, varies as a function of Vin, Vout, $I_L$, and Lout. As described in greater detail below, control circuitry, which determines the ripple band, can be implemented to affect Fsw.

Figure 3:
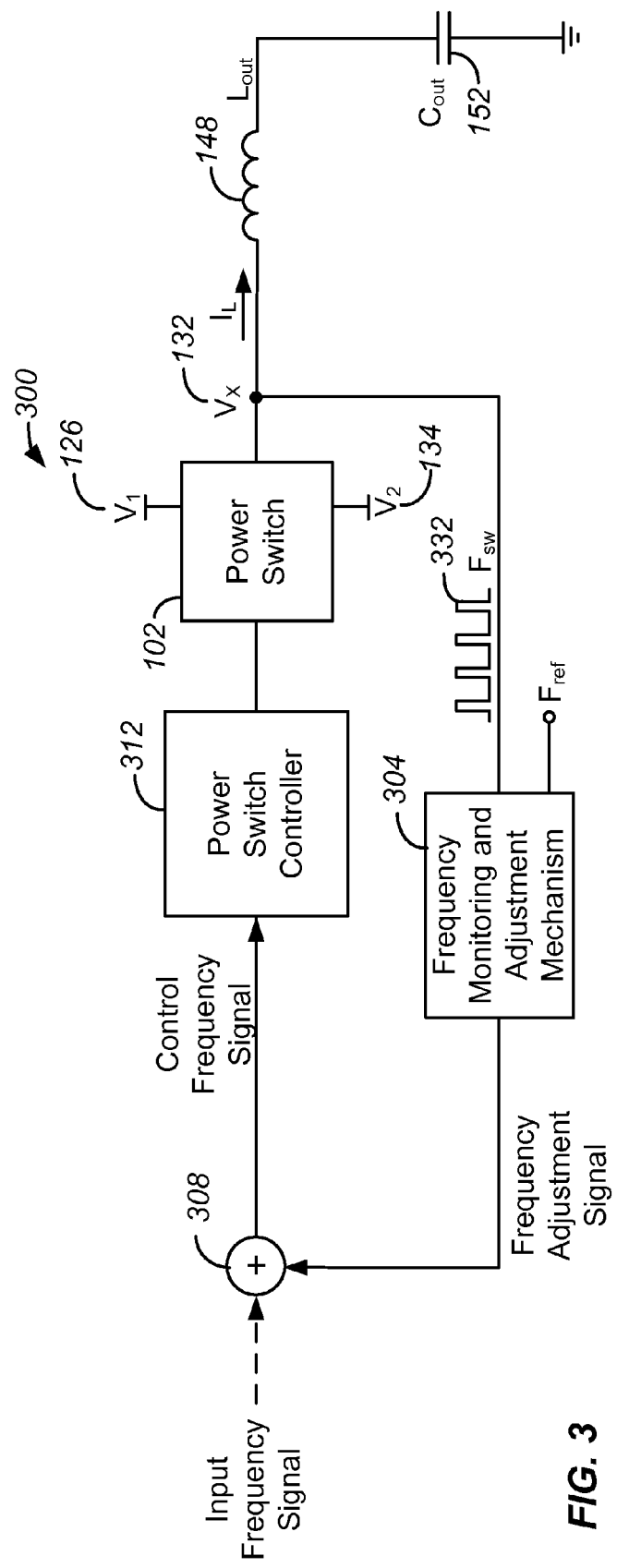
FIG. 3 is a simplified diagram of a voltage regulator 300, incorporating circuitry for controlling the switching frequency of a power switch, according to an embodiment of the invention.

FIG. 3 is a simplified diagram of a voltage regulator 300, incorporating circuitry for controlling the switching frequency of a power switch, according to an embodiment of the invention. The voltage regulator 300 is similar to regulator 100 of FIG. 1A in some respects, with like reference numerals indicating like parts. In some implementations, voltage regulator 300 includes control circuitry for controlling the ramping up and ramping down of the $I_L$ waveform, incorporated into one example of a power switch controller 312 described in greater detail below. In this example, a frequency monitoring and adjustment mechanism 304 has an input coupled to the switching node, Vx. The frequency monitoring and adjustment mechanism 304 senses the switching frequency or switching period of the power switch 102 at Vx. In other examples, frequency monitoring and adjustment mechanism 304 can be coupled to sense the switching frequency at other nodes or sources for such information in the voltage regulator, such as one of the switch components of the power switch, e.g., the gate of a FET serving as the high side switch component, or the driver and control unit(s) 106 and 110 of FIG. 1B. The sensed switching frequency can also be derived from the output current delivered to the output filter, and at other nodes in the voltage regulator circuitry. The mechanism 304 is configured to compare the sensed switching frequency with a reference frequency, Fref, and provide a frequency adjustment signal, as described in greater detail below, at an output of the frequency monitoring and adjustment mechanism responsive to this comparison. The frequency adjustment signal can provide a correction term to be supplied as a control frequency signal for power switch controller 312. The control frequency signal provided as an input to the power switch controller can take various forms including current signals and voltage signals, and can indicate values such as upper/lower threshold levels or designated times or pulse widths. Such control signals can be interpreted by the power switch controller and used by the power switch controller to govern the switching frequency of the power switch.

The frequency monitoring and adjustment mechanism 304 can be implemented to include analog circuitry, digital circuitry, and combinations thereof, depending on the desired implementation. For instance, the operations of frequency monitoring and adjustment mechanism 304 disclosed herein can be realized using a phase-locked loop (PLL). In another example, an error amplifier incorporating one or more op-amps is incorporated to compare the monitored switching frequency, Fsw, with the reference frequency, Fref.

In FIG. 3, a summing unit 308 is coupled to receive the frequency adjustment signal from frequency monitoring and adjustment mechanism 304. The summing unit 308 is also coupled to receive an optional input frequency signal, to which the frequency adjustment signal can be applied, to produce the control frequency signal provided to an input of power switch controller 312. The designated frequency conveyed by the input frequency signal can be hard-wired on the chip or can be delivered from another component such as an on-chip or off-chip microcontroller. The designated frequency indicated by the input frequency signal can be adjustable and/or can be user-defined, depending on the desired implementation.

In some implementations, the input frequency signal can be omitted or set to zero, so the frequency adjustment signal output from mechanism 304 is delivered as the control frequency signal to power switch controller 312. Thus, in some implementations, the summing unit 308 can also be omitted, in which case the output of frequency monitoring and adjustment mechanism 304 is directly coupled to the input of power switch controller 312. In this way, in some implementations, it possible for the feedback information provided by the incorporation of frequency monitoring and adjustment mechanism 304 to directly define the ripple band and resulting current $I_L$.

In some implementations, the frequency monitoring and adjustment mechanism 304 is separate and apart from input components/circuitry used to generate and deliver the input frequency signal. In some other implementations, frequency monitoring adjustment mechanism 304 and such input components/circuitry have one or more shared components. Thus, while the frequency adjustment signal and the input frequency signal are illustrated as being delivered to summing unit 308 from different sources, in some implementations, the circuitry for generating such respective signals share one or more circuit components, modules, units, etc. In one example, output stages, including amplifiers and/or current mirrors, can be shared by the input components/circuitry and the frequency monitoring and adjustment mechanism 304.

In one example of an implementation of FIG. 3, the power switch controller 312 is configured to adjust the ripple band of $I_L$ responsive to the control frequency signal, for example, by adjusting one or more of the upper threshold and the lower threshold levels as described above with respect to FIG. 2. The power switch controller 312 in FIG. 3 is a simplified representation of control circuitry for controlling the switching of power switch 102. For instance, power switch controller 312 can include the driver and control units 106 and 110 of FIG. 1B. The power switch controller 312 is coupled between summing unit 308 and an input of power switch 102. In one example, returning to FIG. 1A, power switch controller 312 is configured to cause the power switch to switch from $V_1$ to $V_2$ responsive to $I_L$ reaching the upper threshold and switch from $V_2$ to $V_1$ responsive to $I_L$ reaching the lower threshold. Returning to FIGS. 1A and 1B, in some implementations, one or more of the components 304, 308, and 312 illustrated in FIG. 3 can be incorporated in controller 112. In some other implementations, one or more of the components 304, 308, and 312 are separate components, for instance, located on a different chip than controller 112.

In FIG. 3, in one example of a current mode hysteretic implementation, circuitry within power switch controller 312 is configured to compare the inductor current, $I_L$, with the upper threshold of the ripple band, and compare $I_L$ with the lower threshold of the ripple band. In this way, when $I_L$ reaches the upper threshold level, the circuitry turns on low side switch 108 and turns off high side switch 104 of power switch 102, and when $I_L$ reaches the lower threshold level, the circuitry turns off low side switch 108 and turns on high side switch 104. The disclosed techniques are also applicable to other control processes, such as fixed on time or fixed off time implementations as described below. In the various techniques, the switching frequency can be controlled based on a control frequency signal input to the power switch control circuitry. The control frequency signal can be, or can be based on, feedback information indicating the monitored switching frequency of the power switch.

Figure 4:
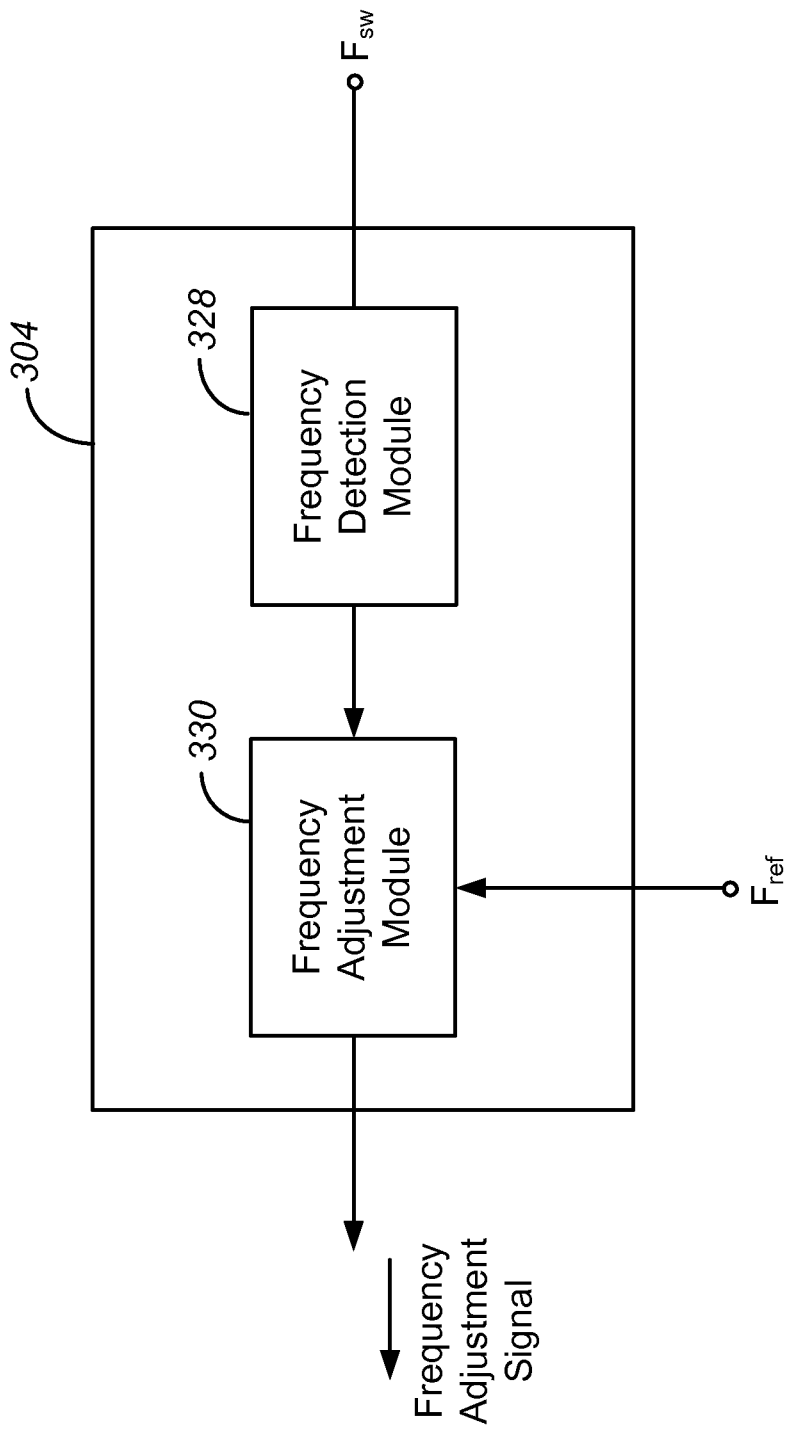
FIG. 4 is a simplified diagram of circuit components of one example of a frequency monitoring and adjustment mechanism, according to an embodiment of the invention.

FIG. 4 is a simplified diagram of circuit components of one example of a frequency monitoring and adjustment mechanism 304, according to an embodiment of the invention. In this example, the frequency monitoring and adjustment mechanism 304 of FIG. 3A includes a frequency detection module 328 having an input coupled to sense the actual switching frequency, Fsw, of the power switch, for instance, at node Vx. In operation, in one implementation, frequency detection module 328 includes circuitry configured to monitor a system switching pulse signal 332 representing Fsw, as shown in FIG. 3, and detect the switching frequency represented by pulse signal 332.

In FIG. 4, frequency monitoring and adjustment mechanism 304 also includes a frequency adjustment module 330, which has two inputs. One input is coupled to receive output information from frequency detection module 328 indicating the sensed switching frequency, and another input is coupled to receive a reference frequency, Fref, which can represent a desired switching frequency of the voltage regulator. The reference frequency can be hard-wired on the chip, e.g., from a clock, or can be delivered from another component such as an on-chip or off-chip microcontroller. The reference frequency can be adjustable and/or can be user-defined, depending on the desired implementation. The frequency adjustment module 330 is configured to compare the sensed switching frequency with the reference frequency, Fref, and generate the frequency adjustment signal according to the comparison. For instance, the comparison can yield a correction term to be supplied. Returning to FIG. 3, this correction term can indicate the measured error relative to the reference frequency and be delivered directly or via summing unit 308 to power switch controller 312. In this way, frequency monitoring and adjustment mechanism 304 can determine the direction of the system switching frequency drift and adjust the frequency adjustment signal in response to the measured error relative to Fref to correct the switching frequency back to the desired frequency represented by Fref.

In FIG. 3, in some implementations, the input frequency signal provided to summing unit 308 can indicate a desired upper threshold level and lower threshold level of the ripple band, and is provided at an input terminal of the control circuitry of the voltage regulator. For instance, the desired upper and lower threshold levels can be entered/set using one or more external hardware components such as a resistor in combination with a current source. In FIGS. 3 and 4, the frequency adjustment signal can be applied to adjust the input upper and/or lower thresholds of the input frequency signal. The frequency adjustment signal can be in the form of a current signal generated by the circuitry of frequency adjustment module 330 according to the information in the system switching pulse 332.

In implementations where the ripple band is increased or decreased to control Fsw, the upper threshold and the lower threshold can be separately adjusted. For example, the upper threshold level can be raised and/or the lower threshold level can be lowered to increase the ripple band, and the upper threshold level can be lowered and/or the lower threshold level can be raised to decrease the ripple band. The frequency monitoring and adjustment mechanism 304 essentially determines whether the system switching pulse 332 is too slow or too fast, and converts the monitored switching pulse 332 to a frequency adjustment signal used to vary (increase or decrease) the ripple band of $I_L$ to control the overall switching frequency of power switch 102 and voltage regulator 300. Increasing the ripple band reduces Fsw, and decreasing the ripple band increases Fsw.

The disclosed techniques for monitoring and adjusting the switching frequency of a voltage regulator are applicable to current mode control architectures. By way of example, U.S. Pat. No. 7,170,267 ("the '267 patent"), titled "Switching Regulator with Average Current Mode Control," by McJimsey, issued Jan. 30, 2007, the entire disclosure of which is hereby incorporated by reference in its entirety and for all purposes, describes the use of current mode control to control current through the output filter and thus control the output voltage, Vout. Current mode control generally refers to controlling the switching behavior of the switch components of the power switch, such that Vout is regulated through direct or indirect control of the average output current through the output filter and through the load. Current mode control can also refer to peak current mode control, as an alternative to average current mode control.

Figure 5:
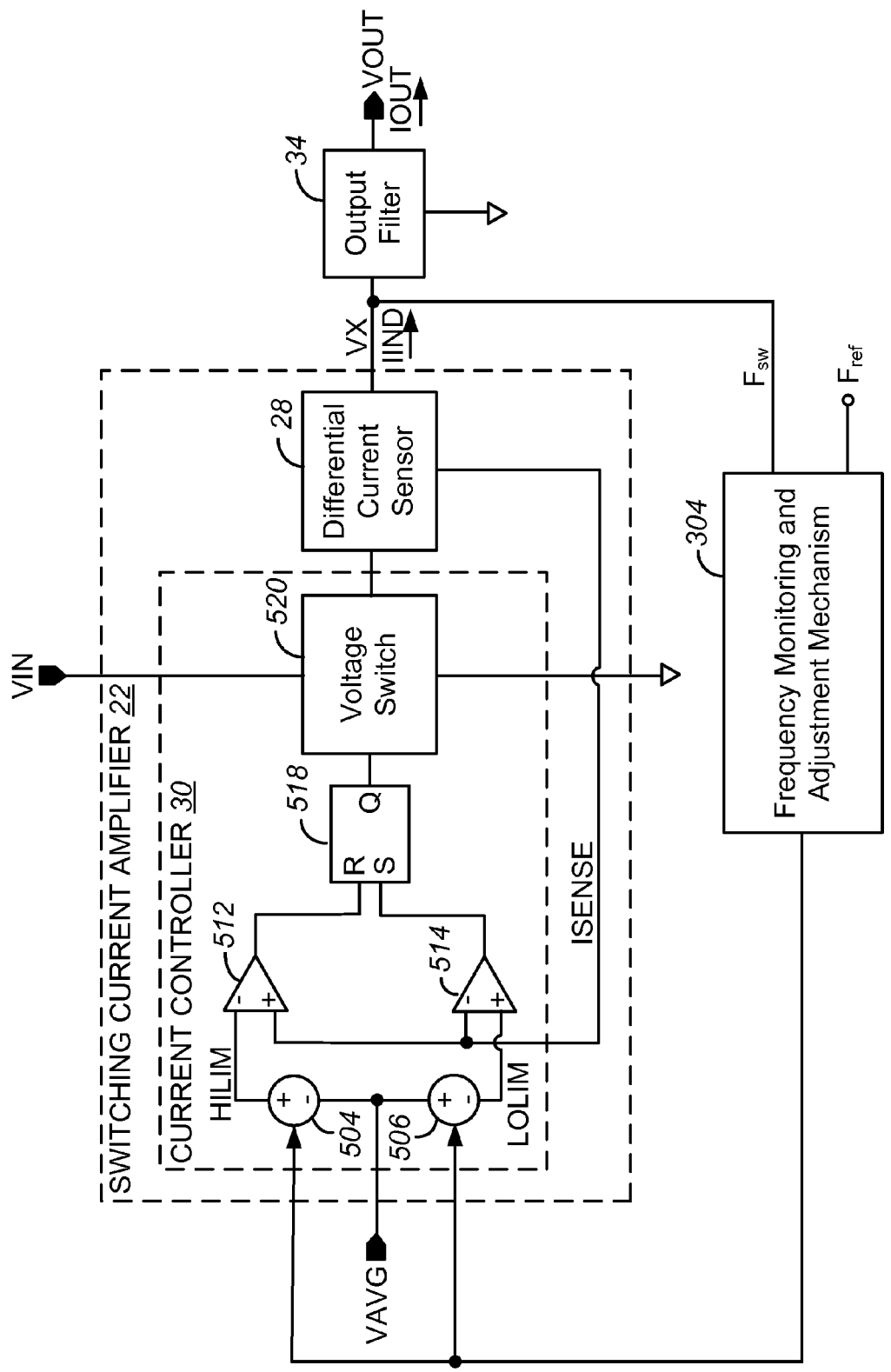
FIG. 5 is a simplified diagram of components of a control circuit for a voltage regulator, according to an embodiment of the invention.

FIG. 5 illustrates a switching current amplifier 22 that has a current controller 30 and a differential current sensor 28, which are described in the '267 patent. Current controller 30 operates to alternately connect output filter 34 to VIN, also referred to herein as $V_{DD}$, and GND (Gnd), via differential current sensor 28, thereby regulating average current through output filter 34. Differential current sensor 28 measures the current through output filter 34 and provides a feedback signal ISENSE to current controller 30. Current controller 30 compares feedback signal ISENSE with the desired average current indicated by control signal VAVG to implement the alternating connection between output filter 34 and VIN or GND. Signal VAVG is input to switching current amplifier 22, as shown.

Figure 6:
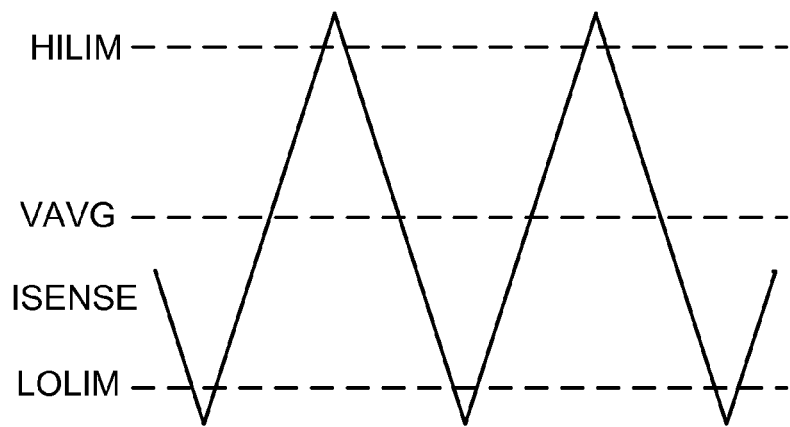
FIG. 6 is an illustration of a ripple waveform of current $I_L$ provided to an inductor of the output filter of a voltage regulator, according to another embodiment of the invention.

FIG. 6 shows the resulting waveform of current through the inductor of the output filter, as described in the '267 patent. VAVG is a voltage representing a desired average output current IOUT and can be generated by a voltage controller. In the '267 patent, two voltage threshold levels, HILIM and LOLIM, are generated symmetrically around voltage VAVG by offsets 504 and 506, as shown in FIGS. 5 and 6. The difference between HILIM and LOLIM represents an allowable ripple in output current IOUT from switching current amplifier 22, where each of offsets 504 and 506 represents half the ripple value. Differential current sensor 28 senses current IIND through output filter 34 and generates a voltage signal ISENSE representative of current IIND. Though FIG. 6 is shown in the voltage domain, the disclosed circuitry can be implemented using current signals, or a combination of current and voltage. For example, the voltage threshold level, HILIM, can be realized by summing a current with the desired average current and delivered across a resistive device such as a reference FET or a series of reference FETs and power FETs.

As shown in FIG. 5, signal ISENSE is fed back to two comparators 512, 514 of current controller 30, which compare signal ISENSE with threshold levels HILIM and LOLIM, thereby comparing current IIND to the desired average output current VAVG, while allowing for ripple. Comparators 512 and 514 cooperate to toggle an output Q of a set-reset latch 518 when signal ISENSE reaches either threshold level HILIM or LOLIM. Output Q from set-reset latch 518 is input to voltage switch 520, which connects output filter 34 to either VIN or GND through differential current sensor 28. The resulting waveform of signal ISENSE and threshold levels HILIM and LOLIM are illustrated in FIG. 6. The average of signal ISENSE, shown as VAVG, may be achieved independent of switching duty factor, output filter 34 inductor value, output filter 34 capacitor value, input supply voltage VIN, and/or output voltage VOUT.

In FIG. 5, the current mode control circuitry also incorporates a frequency monitoring and adjustment mechanism 304 as described herein, separate and apart from the switching current amplifier 22 components described above. Frequency monitoring and adjustment mechanism 304 is coupled to sense the actual switching frequency of the voltage regulator, for instance, at node Vx, and compare this detected frequency with a reference frequency, Fref. A frequency adjustment signal can be generated based on this comparison, as described above with respect to FIGS. 3 and 4. In the implementation of FIG. 5, the frequency adjustment signal includes one or more correction terms used to adjust one or both of the HILIM and LOLIM offsets 504 and 506, and thereby adjust the HILIM and LOLIM values representing the upper and lower threshold levels, respectively, of the ripple band. In some implementations, the frequency adjustment signal can be in the form of a current signal, which is divided by two (2) or some other designated factor to define the control frequency signal described above with reference to FIG. 3. The control frequency signal can be applied as a positive value to HILIM offset 504, i.e., added to the HILIM level, to adjust the HILIM threshold, and the control frequency signal can be applied as a negative value to LOLIM offset 506, i.e., subtracted from the LOLIM level to adjust the LOLIM threshold, thereby adjusting the ripple band. Thus, the switching frequency can be adjusted accordingly.

The disclosed techniques for switching frequency control are not limited to inductor ripple band regulation. Feedback loops incorporating frequency monitoring and adjustment mechanisms as disclosed herein can be incorporated to control a high side on time or low side on time type of voltage regulator. For example, the feedback current output from the frequency monitoring and adjustment mechanism can be used to reduce or increase the on time pulse width to control the system switching frequency.

Figure 7:
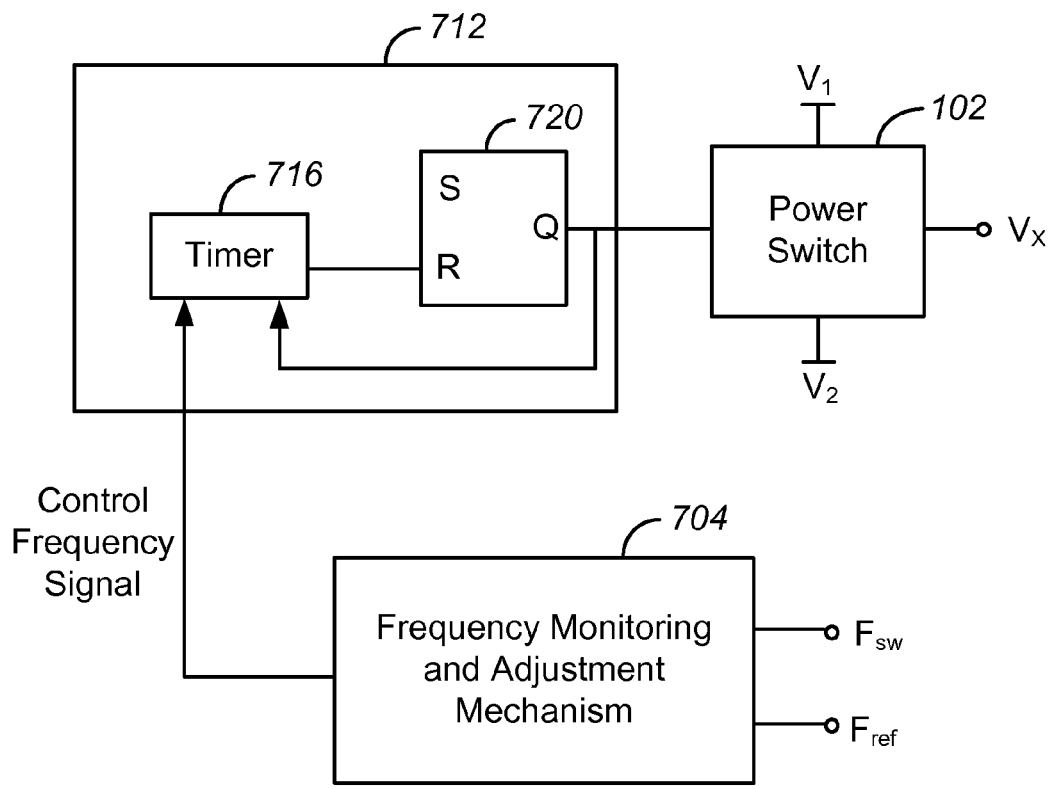
FIG. 7 is a simplified diagram of components of a control circuit for a fixed on-time regulator, according to an embodiment of the invention.

FIG. 7 is a simplified diagram of components of a control circuit for a fixed on time regulator, according to an embodiment of the invention. In another implementation of a power switch controller 712, having an alternative configuration to power switch controller 312 described above, power switch controller 712 includes a timer 716, for instance, having a fixed on time or a variable on time. The timer 716 has an input coupled to receive a control frequency signal from the output of frequency monitoring and adjustment mechanism 704. In this implementation, the output of the frequency monitoring and adjustment mechanism 704 is directly coupled to the timer 716, so the frequency adjustment signal output from mechanism 704, as generally described above, is the control frequency signal. In some implementations, the control frequency signal can indicate to the timer 716 an on time pulse width for one of the switching components of the power switch 102. In some other implementations, the control frequency signal can indicate a reference time, or an adjustment to a reference time, a fixed time after which the timer 716 will activate. The output of timer 716 is coupled to a state machine register 720. In this implementation, register 720 is an SR latch with timer 716 connected to the "R" reset input. The "Q" output of register 720 is coupled to control the on-time of one of the switch components of the power switch, such as the high side switch. The state machine register 720 and timer 716 generally cooperate to control the switching of power switch 102.

In FIG. 7, in one example, when the timer 716 output goes to '1' or high, this causes the register 720 to be set. When register 720 is set, in the example of an SR latch, the Q output goes high, which can turn on the high side switch 104 of the power switch 102. Responsive to the Q output going high, the timer 716 can be coupled to monitor the Q output and activate the R input of register 720 a fixed time later to reset the latch back to '0' at the Q output and initiate the low side conduction period, i.e., turn on the low side switch 108. In this example, the voltage regulator is thus provided with a fixed high side (104) on time. The low side (108) on time, however, varies to provide the desired regulation. The control frequency signal delivered by the frequency monitoring adjustment mechanism 704 can thus provide an appropriate correction term be used by the timer to adjust such on times, depending on the desired implementation.

Figure 8:
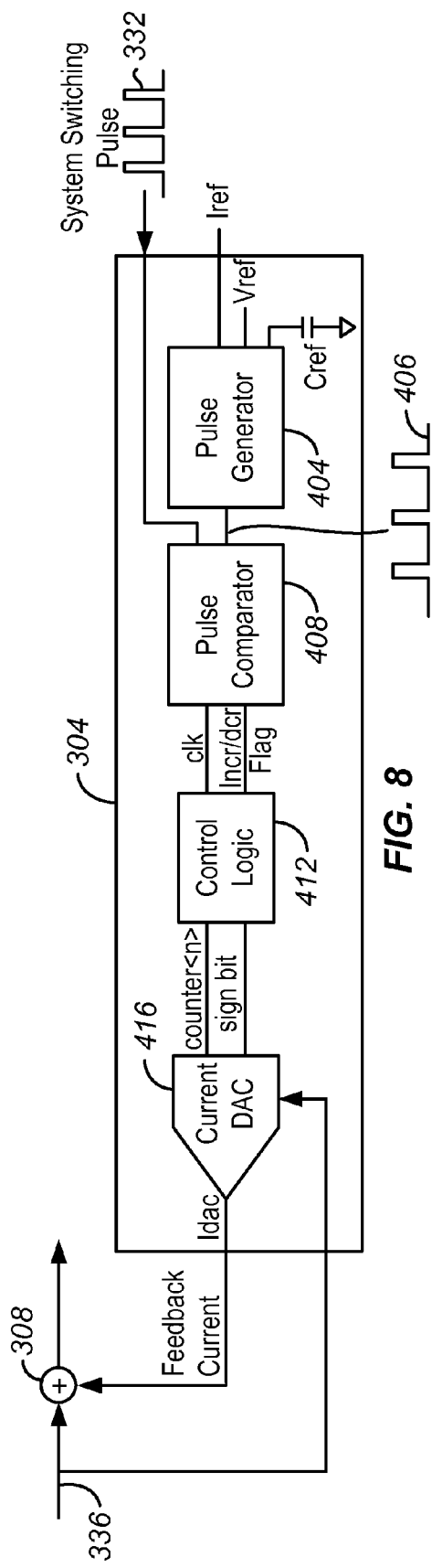
FIG. 8 is a simplified diagram of one example of a frequency monitoring and adjustment mechanism 304, according to an embodiment of the invention.

FIG. 8 is a simplified diagram of circuit components of one example of a frequency monitoring and adjustment mechanism 304, according to an embodiment of the invention. In this configuration, frequency monitoring and adjustment mechanism 304 is generally configured to monitor Fsw of power switch 102 and determine whether Fsw is too slow or too fast with respect to a desired or reference frequency. In the example of FIG. 8, frequency monitoring and adjustment mechanism 304 incorporates a pulse generator 404 having a first input coupled to a designated reference current, Iref, a second input coupled to a designated reference voltage, Vref, and a third input coupled to a capacitor with a reference capacitance value of Cref. The pulse generator 404 includes circuitry configured to generate a reference frequency, Fref, based on these input reference values. In this implementation, Fref can be represented in terms of a reference pulse signal 406 having a reference pulse width, Tp, derived as:

$$Tp = \frac{Cref \cdot Vref}{Iref}$$

In FIG. 8, this particular example of a frequency monitoring and adjustment mechanism 304 further includes a pulse comparator 408 having a first input coupled to receive the system switching pulse signal 332, and a second input coupled to sense the reference pulse signal 406 at the output of pulse generator 404. The pulse comparator 408 is configured to compare the system switching pulse 332 with the reference pulse 406 to determine whether the ripple band of power switch controller 312 is to be corrected. In one embodiment, the pulse width, Tp, of the reference pulse signal 406 can be a designated multiple, N, of the desired switching period. In this implementation, Cref and Iref can be derived from external components. The use of the multiple N factor provides for a wider selection of external components to derive the pulse width, Tp, of the reference pulse signal 406. The designated multiple N pulse width can be compared with an identical multiple N width of the period of the system switching pulse signal 332. In this way, the desired switching period can be achieved.

In FIG. 8, a control logic unit 412 and a current digital-to-analog converter (DAC) unit 416 can be incorporated. In one implementation, control logic unit 412 can be implemented to include an up-and-down N-bit counter coupled to receive the compared signal output from pulse comparator 408. The compared signal is output from pulse comparator 408 responsive to pulse comparator 408 comparing system switching pulse 332 with the reference pulse signal, as described above.

In one example, as shown in FIG. 8, the compared signal can be logically decoded and delivered to the N-bit counter of control logic unit 412 as a clock input and can include an increment/decrement flag to determine whether to increment or decrement the counter 904. In one implementation, comparator 408 can be configured to make an increment or decrement determination after a predetermined number of consecutive increment or decrement logic outputs in the compared signal output from comparator 408. For instance, if the period of the system switching pulse signal 332 is too short for a designated number of cycles, the N-bit counter will count up. If the period of the system switching pulse signal 332 is too long for a designated number of cycles, the N-bit counter will count down. If Fsw is locked, as described above, the counter can be configured to neither count up nor count down. Such a configuration could create a slew rate limited response for system stability. Other types of digital control can use the comparator output and prompt the system to respond based on a time constant.

In FIG. 8, the counter output value and a decrement flag, e.g., in the form of a sign bit, provided by control logic unit 412 in response to the operations described above are provided as inputs to current DAC 416. Responsive to these inputs, current DAC 416 is configured to output the feedback current, as described above, to summing unit 308. An input frequency signal 336 can be provided as a reference input to current DAC 416 so frequency monitoring and adjustment mechanism 304 has a full dynamic range of control of the system switching frequency, Fsw, and can reduce the initial time taken to lock to the desired frequency.

In one implementation, the pulse width, Tp, of the reference pulse signal 406 can alternate between two different window threshold pulse widths for pulse comparator 408 to logically determine if the ripple band should be increased or decreased. These window threshold pulse widths, $Tp_{upper}$ and $Tp_{lower}$, can be set according to respective currents based on the reference current: Iref (1−x) and Iref (1+x). The window threshold pulse widths are thus derived as follows:

$$Tp_{upper} = \frac{Cref \cdot Vref}{Iref(1-x)}$$

$$Tp_{lower} = \frac{Cref \cdot Vref}{Iref(1+x)}$$

where x can be set to determine the window size or the accuracy of the desired frequency. The $Tp_{upper}$ and $Tp_{lower}$ calculations are used to prevent dithering in digital implementations, as further described below.

Figure 9:
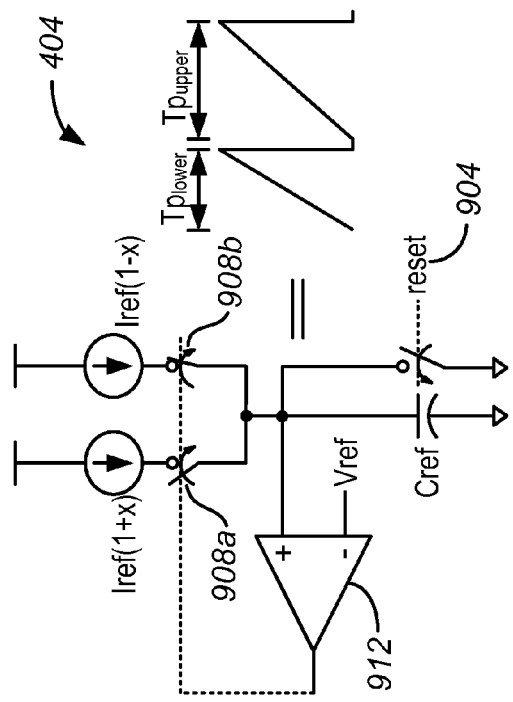
FIG. 9 is a simplified diagram of circuit components of a pulse generator 404 of frequency monitoring and adjustment mechanism 304, configured according to one example.

FIG. 9 is a simplified diagram of circuit components of a pulse generator 404 of frequency monitoring and adjustment mechanism 304, configured according to one example. The circuit components of FIG. 9 represent one implementation of circuitry to realize the $Tp_{upper}$ and $Tp_{lower}$ thresholds as set forth above. In particular, the pulse generator 404 operation can be synchronized to the rising/falling edge of the system switching pulse 332 through a reset control switch 904, depending on the desired implementation. In the example of a rising edge synchronization implementation, the reset switch 904 is closed momentarily, sufficiently to discharge the voltage across Cref. Upon opening of the reset switch 904, Cref will be charged to Vref by one of the current sources, Iref(1+x) or Iref(1−x). Switches 908a and 908b respectively connected to these two current sources operate such that only one switch 908a or 908b is closed each time and in alternating fashion. If Iref(1+x) is charging Cref to above Vref, output logic from a comparator 912 will cause the switch at Iref(1+x) to open and the switch at Iref(1−x) to close. The alternating switching sequence causes the pulse generator 404 to alternately output two pulses of different pulse widths, $Tp_{upper}$ and $Tp_{lower}$, periodically as shown in FIG. 9.

Figure 10:
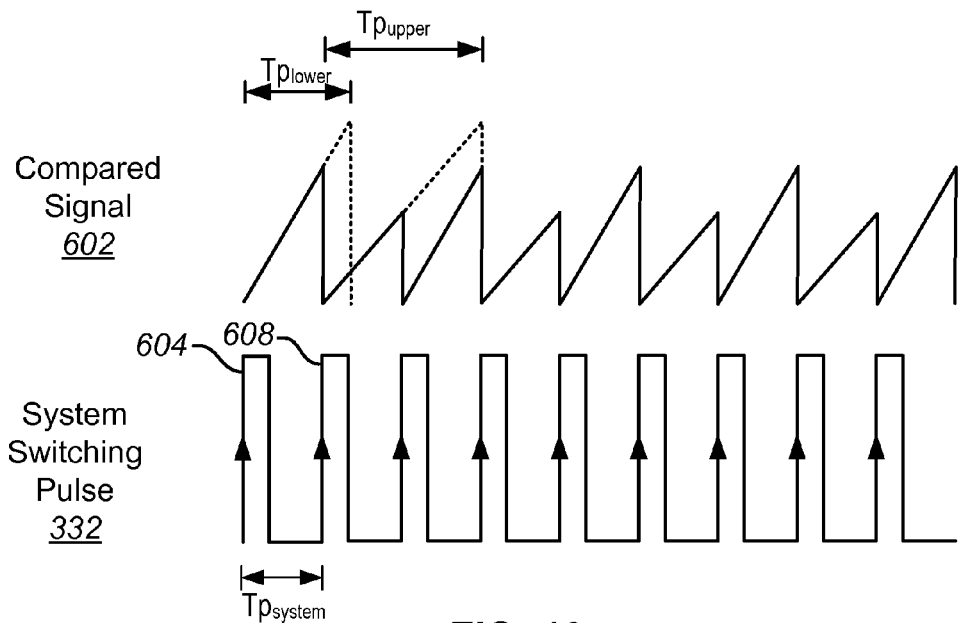
FIG. 10 is an illustration of the comparison of window threshold pulse widths of a reference pulse signal waveform in relation to a system switching pulse to produce a compared signal, according to one example.
Figure 11:
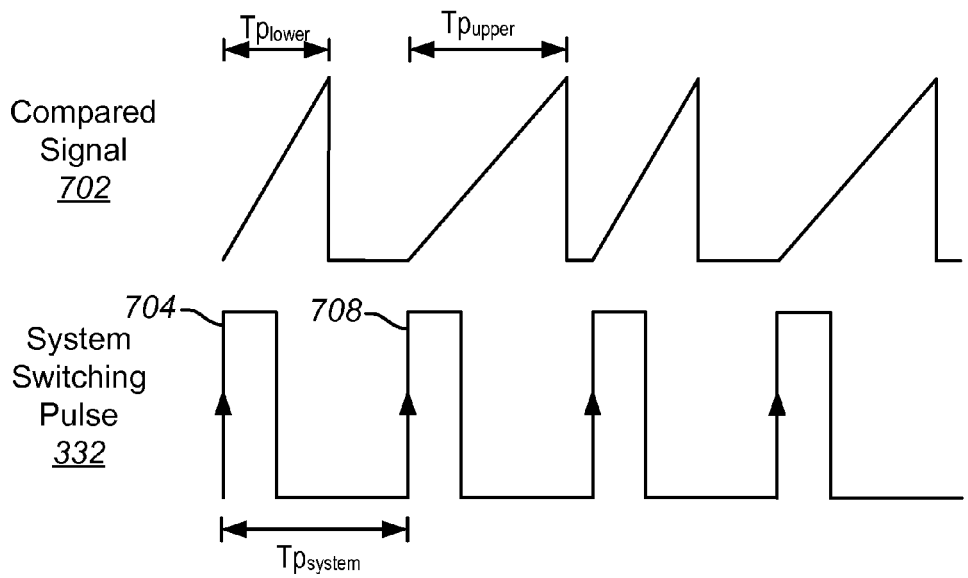
FIG. 11 is an illustration of the comparison of window threshold pulse widths of a reference pulse signal waveform in relation to the system switching pulse to produce a compared signal, according to another example.
Figure 12:
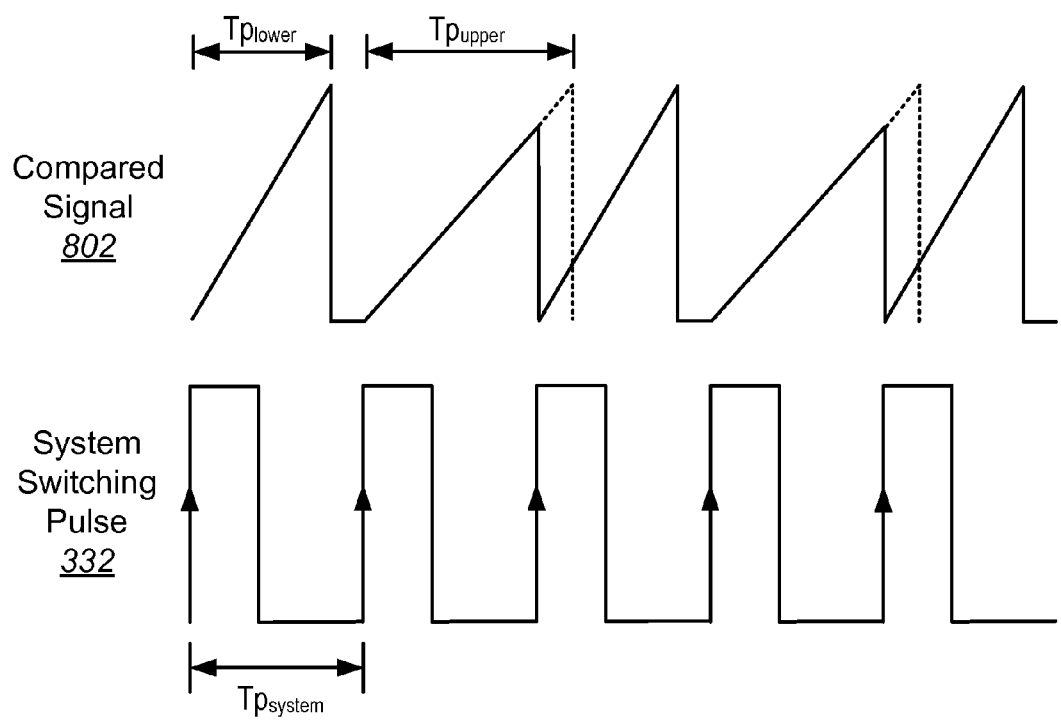
FIG. 12 is an illustration of the comparison of window threshold pulse widths of a reference pulse signal waveform in relation to the system switching pulse to produce a compared signal, according to yet another example.

FIGS. 10, 11, and 12 illustrate hysteresis in accordance with the disclosed implementations that can be incorporated to avoid dithering, also referred to as chatter. When the disclosed circuits are implemented in digital contexts, attempting to lock the switching frequency to a desired frequency value can be problematic. Even when slight correction terms are applied when the monitored switching frequency is slightly slower or higher than the desired frequency, dithering, or oscillating above and below the desired frequency for some time, can occur if the desired frequency value is between digital values provided by the circuit.

FIG. 10 illustrates the comparison of the $Tp_{upper}$ and $Tp_{lower}$ window thresholds of a reference pulse signal waveform by pulse comparator 408 in relation to a system switching pulse 332, to produce a compared signal 602 output from pulse comparator 408, according to an embodiment of the invention. In one implementation, when the system switching pulse 332 initially goes high at a first rising edge 604, the pulse comparator 408 outputs the $Tp_{lower}$ portion of the reference pulse signal waveform, as illustrated in FIG. 10. Here, since the period of the system switching pulse 332, $Tp_{system}$, is shorter than $Tp_{lower}$, the system switching pulse 332 will cause pulse comparator 408 to reset its output before the expiration of the $Tp_{lower}$ period. When the system switching pulse goes high again, i.e., at a second rising edge 608, pulse comparator 408 will output the $Tp_{upper}$ part of the reference pulse signal waveform. In this example, $Tp_{system}$ is shorter than $Tp_{upper}$, causing pulse comparator 408 to reset its output before the expiration of the $Tp_{upper}$ period. In an alternative implementation, the compared signal can be decoded logically to have two reset pulses during each successive $Tp_{lower}$ and $Tp_{upper}$ output.

FIG. 11 is an illustration of the comparison of window threshold pulse widths of a reference pulse signal waveform in relation to the system switching pulse to produce a compared signal 702, according to another example. FIG. 11 illustrates the operation of pulse comparator 408 when $Tp_{system}$ is longer than $Tp_{desired}$, and $Tp_{system}$ is longer than $Tp_{lower}$ and $Tp_{upper}$. In this example, the $Tp_{lower}$ and $Tp_{upper}$ parts of the reference pulse signal waveform output from pulse comparator 408 are not reset before the expirations of these periods. The first rising edge 704 of the system switching pulse 332 will trigger the output of the $Tp_{lower}$ part of the reference pulse signal waveform from pulse comparator 408, the second rising edge 708 of the system switching pulse 332 will result in pulse comparator 408 outputting the $Tp_{upper}$ part, and this sequence of events alternates as illustrated in FIG. 11. In an alternative implementation, the compared signal can be decoded logically to have no reset pulses during each successive $Tp_{lower}$ and $Tp_{upper}$ output.

FIG. 12 is an illustration of the comparison of window threshold pulse widths of a reference pulse signal waveform in relation to the system switching pulse to produce a compared signal 802, according to yet another example. FIG. 12 shows the scenario in which the overall switching frequency, Fsw, can be locked in accordance with the techniques described herein. This is the case when the system switching pulse width, $Tp_{system}$, is longer than $Tp_{lower}$ and shorter than $Tp_{upper}$ of the reference pulse signal waveform output from pulse generator 404, as illustrated. In an alternative implementation, the compared signal can be decoded logically to have one reset pulse during each successive $Tp_{lower}$ and $Tp_{upper}$ output.

In some implementations of FIGS. 10, 11, and 12, adjustments can be made on a cycle-by-cycle basis. That is, a frequency adjustment signal can be provided by frequency monitoring and adjustment mechanism 304 to adjust the switching frequency at each pulse of the reference pulse signal 406 when the system switching frequency pulses are outside of the windows of the reference pulse signal 406. In a time-averaged implementation, counters can be implemented to count the number of pulses in both the system switching pulse signal 332 and the reference pulse signal 406 received over a designated timeframe or count of one of the signals. For instance, when 100 pulses are received by a counter coupled to the reference pulse signal, and 95 pulses of the system switching pulse signal are received during the same timeframe, it can be determined that the monitored system switching frequency was slower by 5 cycles. In some implementations, the up-or-down correction term of the frequency adjustment signal can be the same fixed or designated value, regardless or the size of the overshot or shortfall, e.g., 5 cycles. In other implementations, the correction term can be adjusted over time in linear fashion, based on how much faster or slower the switching frequency is than the reference frequency. For instance, the correction term can have a value proportional to the difference in cycles.

Depending on the desired implementation, different devices, apparatus, circuitry, components, mechanisms, modules, and units as described herein can be fabricated so that they share the same substrate, e.g., are on the same die or chip. In an alternative implementation, such devices, apparatus, circuits, components, mechanisms, and/or units can be fabricated on different substrates, e.g., on different chips. In either implementation, such devices, apparatus, circuits, components, mechanisms, and/or units can be provided in the same or different packages. For instance, a frequency monitoring and adjustment mechanism 304 and summing unit 308 fabricated on a first die could be interconnected with a power switch controller 312 fabricated on a different second die, interconnected with one another as described above, and provided in the same package. In another example, the circuit components of frequency monitoring and adjustment mechanism 304 could be implemented in a discrete controller separate from other mechanisms and components in the embodiments described herein.

While the disclosed subject matter has been particularly shown and described with reference to specific embodiments thereof, it will be understood by those skilled in the art that changes in the form and details of the disclosed embodiments may be made without departing from the spirit or scope of the invention. The present invention should of course, not be limited to the depicted embodiments. In addition, although various advantages and aspects of the disclosed subject matter have been discussed herein with reference to various embodiments, it will be understood that the scope of the invention should not be limited by reference to such advantages and aspects. Rather, the scope of the invention should be determined with reference to the appended claims.

What is claimed is:

1. Circuitry for controlling the switching frequency of a voltage regulator, the circuitry comprising:
   frequency monitoring and adjustment circuitry coupled to sense a switching frequency of a power switch coupled to an output filter of the voltage regulator, the frequency monitoring and adjustment circuitry configured to: compare the switching frequency of the power switch with a frequency of a reference signal, and generate a frequency adjustment signal according to the comparison of the switching frequency with the frequency of the reference signal; and
   power switch control circuitry configured to control switching of the power switch based on the frequency adjustment signal, the frequency adjustment signal indicating a correction term corresponding to an adjustment to one or more thresholds of a ripple band of a varying current provided by the power switch, the power switch control circuitry including:
      a first comparator having a first input configured to receive a first signal representing a high threshold level of the ripple band, the first signal representing the high threshold level of the ripple band based on a first offset from a first reference voltage in response to the generated frequency adjustment signal, and a second input configured to receive a second signal representing a current through the output filter, and
      a second comparator having a first input configured to receive a third signal representing a low threshold level of the ripple band, the third signal representing the low threshold of the ripple band based on a second offset from a second reference voltage in response to the generated frequency adjustment signal, and a second input configured to receive the second signal representing the current through the output filter, wherein an output of the first comparator and an output of the second comparator are used to control switching of the power switch.

2. The circuitry of claim 1, wherein the varying current is capable of being provided to the output filter responsive to the power switch switching between an input first voltage and an input second voltage, the switching frequency being associated with the varying current, the frequency adjustment signal associated with an upper threshold and/or a lower threshold of a ripple band of the varying current.

3. The circuitry of claim 2, the frequency adjustment signal being applied to an input frequency signal to define a control signal, the power switch control circuitry configured to adjust the ripple band of the varying current responsive to the control signal.

4. The circuitry of claim 2, the ripple band of the varying current being defined by the upper threshold and the lower threshold between which the varying current varies.

5. The circuitry of claim 4, wherein adjusting the ripple band includes adjusting one or more of the upper threshold and the lower threshold.

6. The circuitry of claim 5, wherein adjusting one or more of the upper threshold and the lower threshold includes one or more of: raising the upper threshold and lowering the lower threshold.

7. The circuitry of claim 5, wherein adjusting one or more of the upper threshold and the lower threshold includes one or more of: lowering the upper threshold and raising the lower threshold.

8. The circuitry of claim 1, the frequency adjustment signal being a current signal.

9. The circuitry of claim 1, the power switch control circuitry including:
a latch having an output coupled to an input of the power switch, and
a timer having an output coupled to an input of the latch and an input coupled to receive the frequency adjustment signal from the frequency monitoring and adjustment circuitry.

10. The circuitry of claim 9, the frequency adjustment signal indicating a pulse width of the timer.

11. The circuitry of claim 9, the frequency adjustment signal indicating an adjustment to a pulse width of the timer.

12. The circuitry of claim 1, the frequency monitoring and adjustment circuitry including:
a comparator configured to compare a switching pulse signal corresponding to the sensed switching frequency with a reference pulse signal corresponding to the reference frequency to provide a compared signal.

13. The circuitry of claim 12, the frequency monitoring and adjustment circuitry including:
a pulse generator configured to provide the reference pulse signal based on one or more reference inputs.

14. The circuitry of claim 13, the one or more reference inputs including a reference voltage, a reference current, and a reference capacitance.

15. The circuitry of claim 12, the reference pulse signal having a first threshold pulse width and a second threshold pulse width.

16. The circuitry of claim 15, the first threshold pulse width defined in accordance with a first adjusted reference current, the second threshold pulse width defined in accordance with a second adjusted reference current.

17. The circuitry of claim 12, the frequency monitoring and adjustment circuitry including:
a control mechanism coupled to receive the compared signal from the comparator, the control mechanism configured to output the frequency adjustment signal responsive to the compared signal.

18. The voltage regulator of claim 17, the control mechanism including:
a current digital-to-analog converter configured to output the frequency adjustment signal in the form of a current signal.

19. A voltage regulator comprising:
an output filter to be coupled to a load;
a power switch coupled to the output filter, the power switch capable of providing a varying current to the output filter, the varying current being in association with a switching frequency of the power switch switching between an input first voltage and an input second voltage; and
frequency monitoring and adjustment circuitry coupled to sense the switching frequency of the power switch, the frequency monitoring and adjustment circuitry configured to: compare the switching frequency of the power switch with a frequency of a reference signal, and generate a frequency adjustment signal according to the comparison of the switching frequency with the frequency of the reference signal; and
power switch control circuitry coupled to receive the frequency adjustment signal, the power switch control circuitry configured to adjust a ripple band of the varying current responsive to the frequency adjustment signal, the frequency adjustment signal indicating a correction term corresponding to an adjustment to one or more thresholds of the ripple band of the varying current provided by the power switch, the power switch control circuitry including:
a first comparator having a first input configured to receive a first signal representing a high threshold level of the ripple band, the first signal representing the high threshold level of the ripple band based on a first offset from a first reference voltage in response to the generated frequency adjustment signal, and a second input configured to receive a second signal representing the varying current provided to the output filter, and
a second comparator having a first input configured to receive a third signal representing a low threshold level of the ripple band, the third signal representing the low threshold of the ripple band based on a second offset from a second reference voltage in response to the generated frequency adjustment signal, and a second input configured to receive the second signal representing the varying current provided to the output filter, wherein an output of the first comparator and an output of the second comparator are used to control switching of the power switch.

20. The voltage regulator of claim 19, the frequency adjustment signal associated with an upper threshold and/or a lower threshold of a ripple band of the varying current, the ripple band of the varying current being defined by the upper threshold and the lower threshold between which the varying current varies.

21. The voltage regulator of claim 20, wherein adjusting the ripple band includes adjusting one or more of the upper threshold and the lower threshold.

22. The voltage regulator of claim 21, wherein adjusting one or more of the upper threshold and the lower threshold includes one or more of: raising the upper threshold and lowering the lower threshold.

23. The voltage regulator of claim 21, wherein adjusting one or more of the upper threshold and the lower threshold includes one or more of: lowering the upper threshold and raising the lower threshold.

24. The voltage regulator of claim 19, the frequency adjustment signal being a current signal.

25. The voltage regulator of claim 19, the frequency adjustment signal being applied to an input frequency signal to define a control signal, the power switch control circuitry configured to adjust the ripple band of the varying current responsive to the control signal.

26. The voltage regulator of claim 19, the power switch control circuitry including:
a latch having an output coupled to an input of the power switch, and
a timer having an output coupled to an input of the latch and an input coupled to receive the frequency adjustment signal from the frequency monitoring and adjustment circuitry.

27. The voltage regulator of claim 19, the power switch control circuitry further configured to cause the power switch to:

switch from the input first voltage to the input second voltage responsive to the varying current reaching the upper threshold, and switch from the input second voltage to the input first voltage responsive to the varying current reaching the lower threshold.

28. The voltage regulator of claim 19, the power switch including a first transistor coupled between the input first voltage and the output filter.

29. The voltage regulator of claim 28, the power switch further including a second transistor coupled between the input second voltage and the output filter.

30. The voltage regulator of claim 28, the power switch further including a diode coupled between the input second voltage and the output filter.

31. A voltage regulator control process comprising:

sensing a switching frequency of a power switch coupled to an output filter of the voltage regulator, a varying current capable of being provided to the output filter responsive to the power switch switching between an input first voltage and an input second voltage, the switching frequency being associated with the varying current, the varying current provided by the power switch;

comparing the sensed switching frequency with a frequency of a reference signal;

generating a frequency adjustment signal according to the comparison of the sensed switching frequency with the frequency of the reference signal, the frequency adjustment signal indicating a correction term corresponding to the varying current provided by the power switch;

adjusting, by a controller, one or more thresholds of a ripple band of the varying current responsive to the frequency adjustment signal, the adjusting including:

generating a first signal based on a first reference voltage offset in response to the generated frequency adjustment signal, the first signal representing a high threshold level of the ripple band, and generating a second signal based on a second reference voltage offset in response to the generated frequency adjustment signal, the second signal representing a low threshold level of the ripple band;

generating a third signal representing the varying current through the output filter;

generating a first comparator output based on a comparison of the first signal and the third signal;

generating a second comparator output based on a comparison of the second signal and the third signal; and switching the power switch based on the first comparator output and the second comparator output.

32. The process of claim 31, the frequency adjustment signal associated with an upper threshold and/or a lower threshold of a ripple band of the varying current, the ripple band of the varying current being defined by the upper threshold and the lower threshold between which the varying current varies.

33. The process of claim 32, wherein adjusting the ripple band includes adjusting one or more of the upper threshold and the lower threshold.

34. The process of claim 33, wherein adjusting one or more of the upper threshold and the lower threshold includes one or more of: raising the upper threshold and lowering the lower threshold.

35. The process of claim 33, wherein adjusting one or more of the upper threshold and the lower threshold includes one or more of: lowering the upper threshold and raising the lower threshold.

36. The process of claim 31, further comprising:

applying the frequency adjustment signal to an input frequency signal to define a control frequency signal, the ripple band of the varying current being adjusted responsive to the control frequency signal.

* * * * *